(12) United States Patent
Liu et al.

(10) Patent No.: US 12,045,464 B2
(45) Date of Patent: Jul. 23, 2024

(54) DATA READ METHOD, DATA WRITE METHOD, DEVICE, AND SYSTEM

(71) Applicant: HUAWEI TECHNOLOGIES CO., LTD., Guangdong (CN)

(72) Inventors: Hailong Liu, Shanghai (CN); Jie Lei, Hangzhou (CN); Chengguang Zheng, Shanghai (CN); Haolong Zhang, Shenzhen (CN)

(73) Assignee: HUAWEI TECHNOLOGIES CO. LTD, Shenzhen (CN)

(*) Notice: Subject to any disclaimer, the term of this patent is extended or adjusted under 35 U.S.C. 154(b) by 30 days.

(21) Appl. No.: 18/147,950

(22) Filed: Dec. 29, 2022

(65) Prior Publication Data

US 2023/0161476 A1 May 25, 2023

Related U.S. Application Data

(63) Continuation of application No. PCT/CN2021/103528, filed on Jun. 30, 2021.

(30) Foreign Application Priority Data

Jun. 30, 2020 (CN) .......................... 202010617784.8

(51) Int. Cl.
*G06F 3/06* (2006.01)
(52) U.S. Cl.
CPC ............ *G06F 3/061* (2013.01); *G06F 3/0656* (2013.01); *G06F 3/0659* (2013.01); *G06F 3/0674* (2013.01)

(58) Field of Classification Search
CPC ...... G06F 3/061; G06F 3/0656; G06F 3/0659; G06F 3/0674; G06F 11/3476; G06F 16/24552; G06F 16/2453; G06F 16/2471
See application file for complete search history.

(56) References Cited

U.S. PATENT DOCUMENTS

| | | | | |
|---|---|---|---|---|
| 10,101,931 | B1* | 10/2018 | Camp .................. | G06F 12/0866 |
| 11,010,054 | B1* | 5/2021 | Himelstein .......... | G06F 3/0685 |
| 2002/0065998 | A1* | 5/2002 | Buckland ............ | G06F 11/2071 |
| | | | | 711/114 |
| 2018/0011892 | A1* | 1/2018 | Kimura ............... | G06F 16/2365 |
| 2018/0349430 | A1* | 12/2018 | Lee ..................... | G06F 16/2365 |
| 2020/0192804 | A1* | 6/2020 | Lee ..................... | G06F 13/00 |
| 2021/0149915 | A1* | 5/2021 | Lee ..................... | G06F 16/2282 |
| 2021/0382656 | A1* | 12/2021 | Rho ..................... | G06F 3/0679 |
| 2022/0206969 | A1* | 6/2022 | Que ..................... | G06F 13/1684 |

* cited by examiner

*Primary Examiner* — Sean D Rossiter
(74) *Attorney, Agent, or Firm* — WOMBLE BOND DICKINSON (US) LLP

(57) ABSTRACT

A data write method, a data read method, a device, and a system are provided. The data write method is applied to a computer device, which includes a storage device and a plurality of nodes in a non-uniform memory access architecture (NUMA) system, and each node has a buffer and a controller that controls the buffer. The data write method includes: obtaining a write request of target data; determining, in response to the write request, a target page that is in the storage device and that stores the target data; determining, from a plurality of buffers corresponding to the plurality of nodes, a target buffer corresponding to the target page; writing the target data into a page of the target buffer by using a target controller that controls the target buffer; and writing data of the page of the target buffer into the target page in the storage device.

20 Claims, 8 Drawing Sheets

DATA READ METHOD, DATA WRITE METHOD, DEVICE, AND SYSTEM

CROSS-REFERENCE TO RELATED APPLICATIONS

This application is a continuation of International Application No. PCT/CN2021/103528, filed on Jun. 30, 2021, which claims priority to Chinese Patent Application No. 202010617784.8, filed on Jun. 30, 2020. The disclosures of the aforementioned applications are hereby incorporated by reference in their entireties.

TECHNICAL FIELD

This application relates to the field of database technologies, and in particular, to a data read method, a data write method, a device, and a system.

BACKGROUND

In a database, data is usually read from a disk of the database or written into a disk of the database. However, in some scenarios, data in a disk is read for a plurality of times, or data is written into a same page in a disk for a plurality of times. Therefore, if interaction with the disk is performed each time to read or write the data, a large quantity of input/output I/O operations are inevitably increased, thereby increasing I/O overheads and reducing database performance. Therefore, a buffer is usually used to read and write the data. For example, the data is first read from the disk to the buffer, and then the data only needs to be read from the buffer, and the data does not need to be read from the disk. Alternatively, the data is first written into the buffer, and after the data in the buffer reaches an amount, the data in the buffer is written into the disk on a per-page basis.

The buffer is usually managed by a controller. When a service thread needs to read the data from the buffer or write the data into the buffer, the controller locks the buffer. In this case, another service thread cannot access the buffer, and the another service thread can access the buffer only after the controller releases the lock.

Therefore, service threads contend for a lock resource of the buffer, thereby affecting database performance.

SUMMARY

Embodiments of this application provide a data read method, a data write method, a device, and a system. This method can reduce contention of different threads for a lock resource of a log buffer, thereby improving database performance.

A first aspect of this application provides a data write method, applied to a computer device, where the computer device includes a storage device and a plurality of nodes in a non-uniform memory access architecture NUMA system, each node has a buffer and a controller that controls the buffer, and the method includes: obtaining a write request of target data; determining, in response to the write request, a target page that is in the storage device and that stores the target data; determining, from a plurality of buffers corresponding to the plurality of nodes, a target buffer corresponding to the target page; writing the target data into a page of the target buffer by using a target controller that controls the target buffer; and writing data of the page of the target buffer into the target page in the storage device.

The plurality of nodes each have a buffer and a controller for the buffer, and therefore even if a buffer on one node is locked, the target data is not affected to be written by using a buffer on another node. Therefore, contention of different threads for a lock resource of the buffer can be reduced, thereby improving database performance.

In an embodiment, the storage device is configured to store preset-type data, and storage space required by each piece of the preset-type data is fixed. The target data belongs to the preset-type data, and the write request includes an identifier of the target data.

The determining, in response to the write request, a target page that is in the storage device and that stores the target data includes: determining, based on at least the identifier of the target data and the storage space required by each piece of the preset-type data, the target page that is in the storage device and that stores the target data.

This embodiment provides a feasible solution for determining the target page in a scenario in which the storage device is configured to the store preset-type data, and the storage space required by each piece of the preset-type data is fixed.

In an embodiment, the preset-type data indicates a status of a database transaction.

In an embodiment, the identifier of the target data is a number of the target data.

In an embodiment, the determining, from a plurality of buffers corresponding to the plurality of nodes, a target buffer corresponding to the target page includes: determining, based on a page number of the target page, the target buffer corresponding to the target page from the plurality of buffers corresponding to the plurality of nodes.

In an embodiment, the target buffer is determined by using the page number of the target page, thereby providing a feasible solution for determining the target buffer.

In an embodiment, the determining, based on a page number of the target page, the target buffer corresponding to the target page from the plurality of buffers corresponding to the plurality of nodes includes: obtaining, according to a hash algorithm, a hash value corresponding to the page number of the target page; and determining, based on the hash value, the target buffer corresponding to the target page, where a buffer, in the plurality of buffers corresponding to the plurality of nodes, whose number is corresponding to the hash value is the target buffer.

A process of determining the target buffer may be more accurate and efficient according to the hash algorithm.

In an embodiment, the writing the target data into a page of the target buffer by using a target controller that controls the target buffer includes: determining, based on that the page number of the target page is greater than a first page number by using the target controller that controls the target buffer, at least two uninitialized disk pages that are in the storage device and that are corresponding to the target buffer, where the at least two disk pages include the target disk page; and initializing the at least two disk pages in the target buffer by using the target controller that controls the target buffer, where the first page number is a largest page number in initialized pages in the storage device.

When the at least two uninitialized disk pages are initialized, initialization actions can be combined, and a quantity of initialization operations is reduced, thereby reducing lock contention and frequent memory operations.

A second aspect of this application provides a data read method, applied to a computer device, where the computer device includes a storage device and a plurality of nodes in a non-uniform memory access architecture NUMA system, each node has a buffer and a controller that controls the buffer, and the method includes: obtaining a read request of target data; determining, in response to the read request, a target page that is in the storage device and that stores the target data; determining, from a plurality of buffers corresponding to the plurality of nodes, a target buffer corresponding to the target page; reading the target data in the target page in the storage device to a page of the target buffer; and reading the target data in the page of the target buffer by using a target controller that controls the target buffer.

The plurality of nodes each have a buffer and a controller for the buffer, and therefore even if a buffer on one node is locked, the target data is not affected to be read by using a buffer on another node. Therefore, contention of different threads for a lock resource of the buffer can be reduced, thereby improving database performance.

In an embodiment, the storage device is configured to store preset-type data, and storage space required by each piece of the preset-type data is fixed; the target data belongs to the preset-type data, and the write request includes an identifier of the target data; and the determining, in response to the read request, a target page that is in the storage device and that stores the target data includes: determining, based on at least the identifier of the target data and the storage space required by each piece of the preset-type data, the target page that is in the storage device and that stores the target data.

This embodiment provides a feasible solution for determining the target page in a scenario in which the storage device is configured to the store preset-type data, and the storage space required by each piece of the preset-type data is fixed.

In an embodiment, the preset-type data indicates a status of a database transaction.

In an embodiment, the identifier of the target data is a number of the target data.

In an embodiment, the determining, from a plurality of buffers corresponding to the plurality of nodes, a target buffer corresponding to the target page includes: determining, based on a page number of the target page, the target buffer corresponding to the target page from the plurality of buffers corresponding to the plurality of nodes.

In an embodiment, the target buffer is determined by using the page number of the target page, thereby providing a feasible solution for determining the target buffer.

In an embodiment, the determining, based on a page number of the target page, the target buffer corresponding to the target page from the plurality of buffers corresponding to the plurality of nodes includes: obtaining, according to a hash algorithm, a hash value corresponding to the page number of the target page; and determining, based on the hash value, the target buffer corresponding to the target page, where a buffer, in the plurality of buffers corresponding to the plurality of nodes, whose number is corresponding to the hash value is the target buffer.

A process of determining the target buffer may be more accurate and efficient according to the hash algorithm.

A third aspect of this application provides a data write apparatus, applied to a computer device, where the computer device includes a plurality of nodes in a non-uniform memory access architecture NUMA system, each node has a buffer and a controller that controls the buffer, the buffer in each node is configured to perform data read or write on a plurality of disk pages in a disk, and the apparatus includes:

an obtaining unit, configured to obtain a write request of target data;

a determining unit, configured to determine, in response to the write request, a target page that is in the storage device and that stores the target data, where the determining unit is further configured to determine, from a plurality of buffers corresponding to the plurality of nodes, a target buffer corresponding to the target page;

a first write unit, configured to write the target data into a page of the target buffer by using a target controller that controls the target buffer; and a second write unit, further configured to write data of the page of the target buffer into the target page in the storage device.

In an embodiment, the storage device is configured to store preset-type data, and storage space required by each piece of the preset-type data is fixed. The target data belongs to the preset-type data, and the write request includes an identifier of the target data.

The determining unit is configured to determine, based on at least the identifier of the target data and the storage space required by each piece of the preset-type data, the target page that is in the storage device and that stores the target data.

This embodiment provides a feasible solution for determining the target page in a scenario in which the storage device is configured to the store preset-type data, and the storage space required by each piece of the preset-type data is fixed.

In an embodiment, the preset-type data indicates a status of a database transaction.

In an embodiment, the identifier of the target data is a number of the target data.

In an embodiment, the determining unit is further configured to determine, based on a page number of the target page, the target buffer corresponding to the target page from the plurality of buffers corresponding to the plurality of nodes.

In an embodiment, the target buffer is determined by using the page number of the target page, thereby providing a feasible solution for determining the target buffer.

In an embodiment, the determining unit is configured to obtain, according to a hash algorithm, a hash value corresponding to the page number of the target page; and determine, based on the hash value, the target buffer corresponding to the target page, where a buffer, in the plurality of buffers corresponding to the plurality of nodes, whose number is corresponding to the hash value is the target buffer.

A process of determining the target buffer may be more accurate and efficient according to the hash algorithm.

In an embodiment, the first write unit is configured to determine, based on that the page number of the target page is greater than a first page number by using the target controller that controls the target buffer, at least two uninitialized disk pages that are in the storage device and that are corresponding to the target buffer, where the at least two disk pages include the target disk page; and initialize the at least two disk pages in the target buffer by using the target controller that controls the target buffer, where the first page number is a largest page number in initialized pages in the storage device.

When the at least two uninitialized disk pages are initialized, initialization actions can be combined, and a quantity of initialization operations is reduced, thereby reducing lock contention and frequent memory operations.

A fourth aspect of this application provides a data read apparatus, applied to a computer device, where the computer device includes a storage device and a plurality of nodes in a non-uniform memory access architecture NUMA system, each node has a buffer and a controller that controls the buffer, and the apparatus includes:

an obtaining unit, configured to obtain a read request of target data;

a determining unit, configured to determine, in response to the read request, a target page that is in the storage device and that stores the target data, where the determining unit is further configured to determine, from a plurality of buffers corresponding to the plurality of nodes, a target buffer corresponding to the target page;

a first read unit, configured to read the target data in the target page in the storage device to a page of the target buffer; and a second read unit, configured to read the target data in the page of the target buffer by using a target controller that controls the target buffer.

In an embodiment, the storage device is configured to store preset-type data, and storage space required by each piece of the preset-type data is fixed; the target data belongs to the preset-type data, and the write request includes an identifier of the target data; and the determining unit is configured to determine, based on at least the identifier of the target data and the storage space required by each piece of the preset-type data, the target page that is in the storage device and that stores the target data.

This embodiment provides a feasible solution for determining the target page in a scenario in which the storage device is configured to the store preset-type data, and the storage space required by each piece of the preset-type data is fixed.

In an embodiment, the preset-type data indicates a status of a database transaction.

In an embodiment, the identifier of the target data is a number of the target data.

In an embodiment, the determining unit is further configured to determine, based on a page number of the target page, the target buffer corresponding to the target page from the plurality of buffers corresponding to the plurality of nodes.

In an embodiment, the target buffer is determined by using the page number of the target page, thereby providing a feasible solution for determining the target buffer.

In an embodiment, the determining unit is configured to obtain, according to a hash algorithm, a hash value corresponding to the page number of the target page; and determine, based on the hash value, the target buffer corresponding to the target page, where a buffer, in the plurality of buffers corresponding to the plurality of nodes, whose number is corresponding to the hash value is the target buffer.

A process of determining the target buffer may be more accurate and efficient according to the hash algorithm.

A fifth aspect of this application provides a NUMA system, including a plurality of nodes, where each node has a buffer and a controller that controls the buffer, and at least one of the plurality of nodes is configured to perform the method according to any one of the implementations of the first aspect.

A sixth aspect of this application provides a computer device. The computer device includes a plurality of nodes in a non-uniform memory access architecture NUMA system, each node has a buffer and a controller that controls the buffer, and at least one of the plurality of nodes is configured to perform the method according to any one of the implementations of the first aspect.

A seventh aspect of this application provides a chip or a chip system. The chip or the chip system includes at least one processor and a communications interface, the communications interface and the at least one processor are interconnected through a line, and the at least one processor is configured to run a computer program or instructions, to perform the method according to any one of the implementations of the first aspect.

In an embodiment, the at least one processor is a non-uniform memory access architecture NUMA system including a plurality of nodes, and one or more of the plurality of nodes jointly perform the method according to any one of the implementations of the first aspect.

An eighth aspect of this application provides a computer storage medium. The computer storage medium is configured to store computer software instructions used by the foregoing terminal device, and the computer software instructions include a program designed for execution by the computer device.

The computer device may be the computer device described in the sixth aspect.

A ninth aspect of this application provides a computer program product. The computer program product includes computer software instructions, and the computer software instructions may be loaded by a processor to implement the method according to any one of the implementations of the first aspect.

According to the foregoing technical solutions, it can be learned that embodiments of this application have the following advantages:

The embodiments of this application are applied to a computer device, where the computer device includes a storage device and a plurality of nodes in a non-uniform memory access architecture NUMA system, each node has a buffer and a controller that controls the buffer, and the method includes: obtaining a write request of target data; determining, in response to the write request, a target page that is in the storage device and that stores the target data; determining, from a plurality of buffers corresponding to the plurality of nodes, a target buffer corresponding to the target page; writing the target data into a page of the target buffer by using a target controller that controls the target buffer; and writing data of the page of the target buffer into the target page in the storage device. In this way, even if a buffer on one node is locked, reading/writing of a buffer on another node is not affected. Therefore, the embodiments of this application can reduce contention of different threads for a lock resource of the buffer, thereby improving database performance.

DESCRIPTION OF EMBODIMENTS

Embodiments of this application provide a data read method, a data write method, a device, and a system. This method is used to reduce contention of different threads for a lock resource of a log buffer, thereby improving database performance.

The embodiments of this application may be applied to an NUMA system. The following describes the NUMA system.

Figure 1:
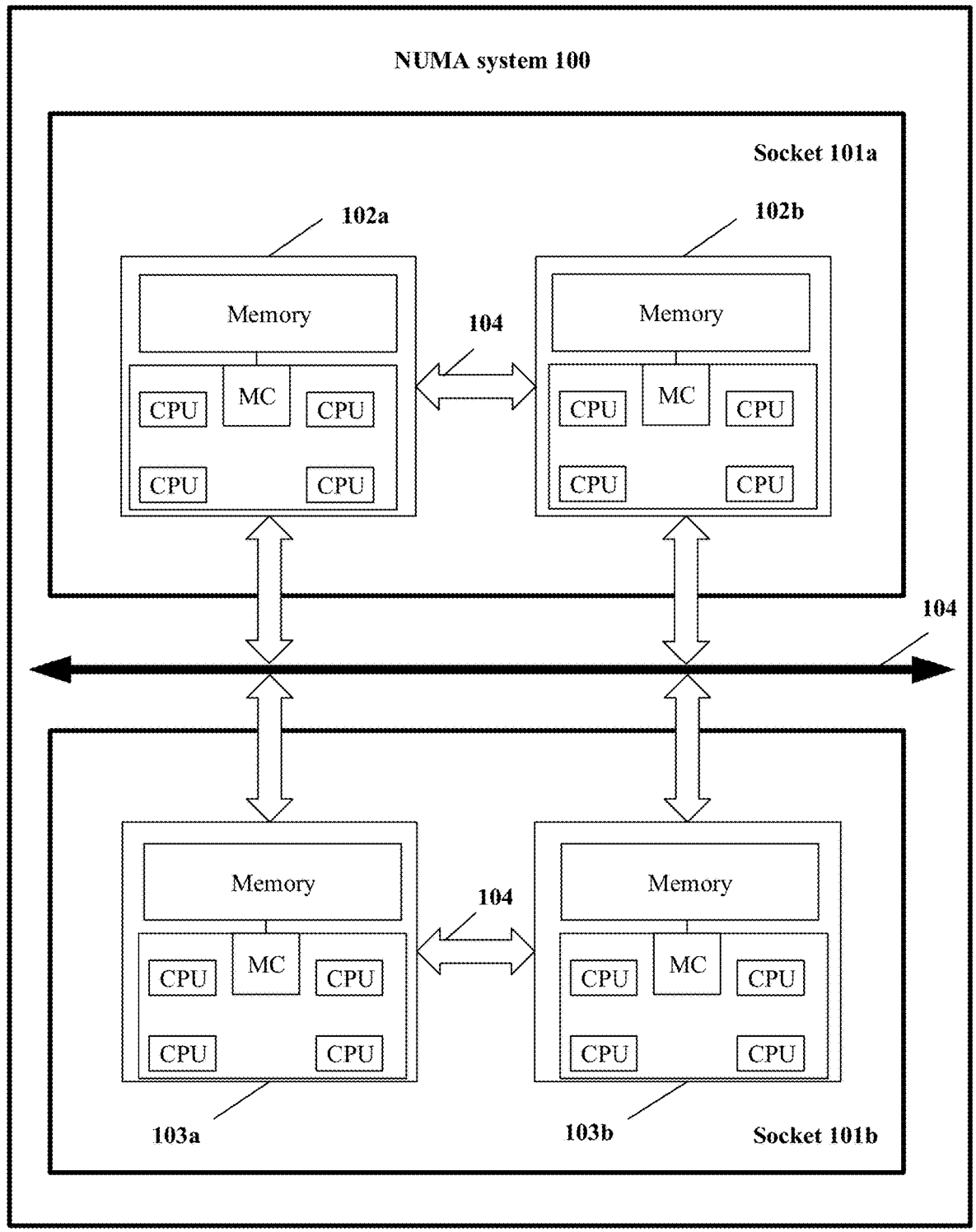
FIG. 1 is a schematic diagram of an architecture of an NUMA system according to an embodiment of this application.

As shown in FIG. 1, the NUMA system 100 may include one or more sockets, and one or more nodes may be installed in each socket. Each node may include a plurality of central processing units (CPU) and a memory. In each node, the CPU manages the memory by using a memory controller (, MC).

In FIG. 1, the NUMA system 100 includes a socket 101a and a socket 101b. The socket (socket) 101a includes two nodes, and the socket 101b also includes two nodes. Each node has four CPUs. It should be noted that a quantity of sockets, a quantity of nodes, and a quantity of CPUs in each node that are depicted in FIG. 1 are merely examples, and constitute no specific limitation on the NUMA system 100. The NUMA system 100 may further include another quantity of sockets and nodes, and each node may also include another quantity of CPUs.

Figure 2:
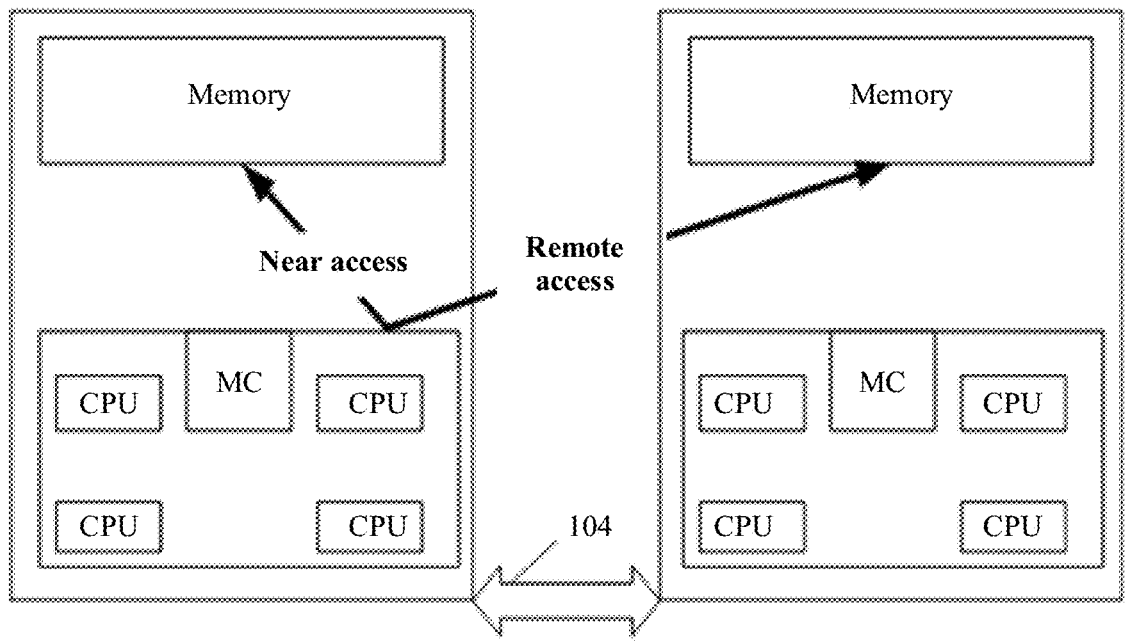
FIG. 2 is a schematic diagram of an embodiment in which a node accesses a memory in an NUMA system according to an embodiment of this application.

In the NUMA system, any two nodes may be communicatively coupled to each other through an interconnection (interconnect) 104. As shown in FIG. 2, two nodes are used as an example. One node may access a memory (which may also be referred to as a near memory) in the node, and one node may further access a memory (which may also be referred to as a remote memory) in another node.

It should be understood that a log has an important impact on database system performance. For example, after a fault occurs in the database system, the database system may recover the database through log replay, to ensure consistency and integrity of the database. The log is stored in a disk. However, if reading and writing of each log directly interact with the disk, a large quantity of input/output I/O operations are increased, which deteriorates database system performance. A log file in the disk is on a per-page basis, and storage space required by each log is much smaller than a page. Therefore, to reduce I/O overheads caused by reading and writing the log, an independent area is allocated in the memory, and this area is referred to as a log buffer, which is a physical memory. In this way, the log buffer can interact with the disk to read and write the log.

Figure 3:
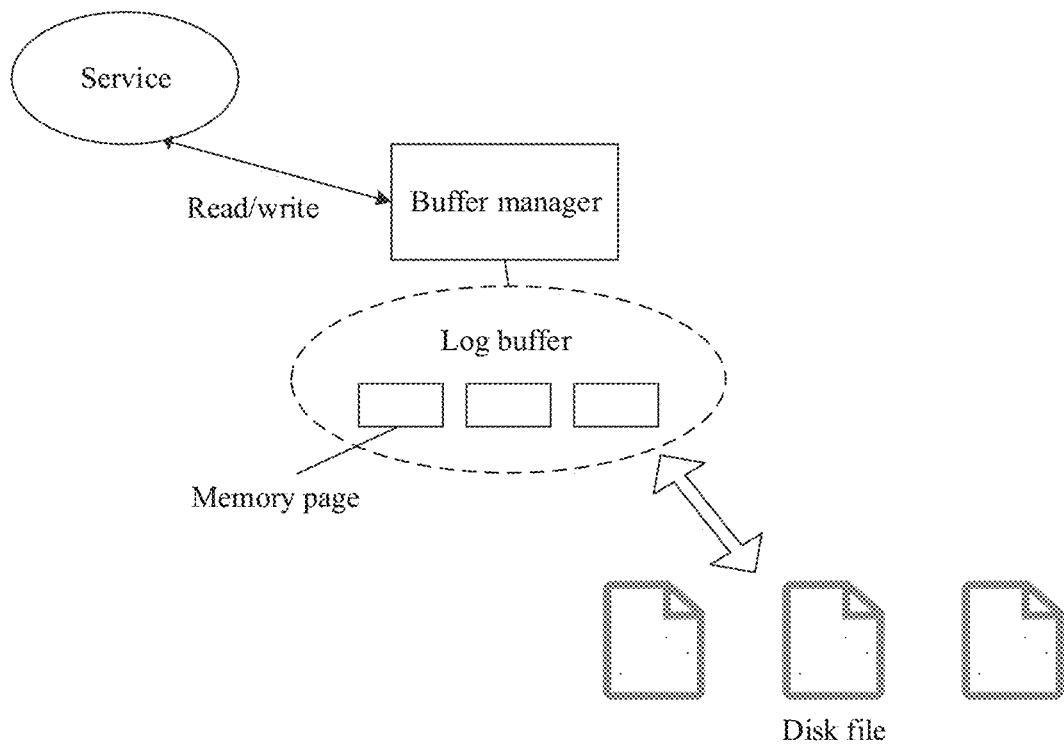
FIG. 3 is a first schematic working diagram of a buffer according to an embodiment of this application.

In an embodiment, as shown in FIG. 3, the log buffer includes a plurality of memory pages, where a size of the memory page is the same as that of a disk page in the disk. When a read/write thread needs to write a log into a disk, the read/write thread may first write the log into a memory page in a log buffer. After a quantity of logs in the log buffer reaches a value, the read/write thread writes the log into a disk page in the disk in batches on a per-page basis. When a read/write thread needs to read a log from a disk, the read/write thread may first read the log from a disk page to a memory page of a log buffer, and then read the log from the memory page of the log buffer.

It should be understood that a memory resource is limited, and therefore a size of the log buffer is limited. Therefore, to implement reuse of the memory page in the log buffer, the log buffer is usually managed according to a least recently used (LRU) algorithm.

Figure 4:
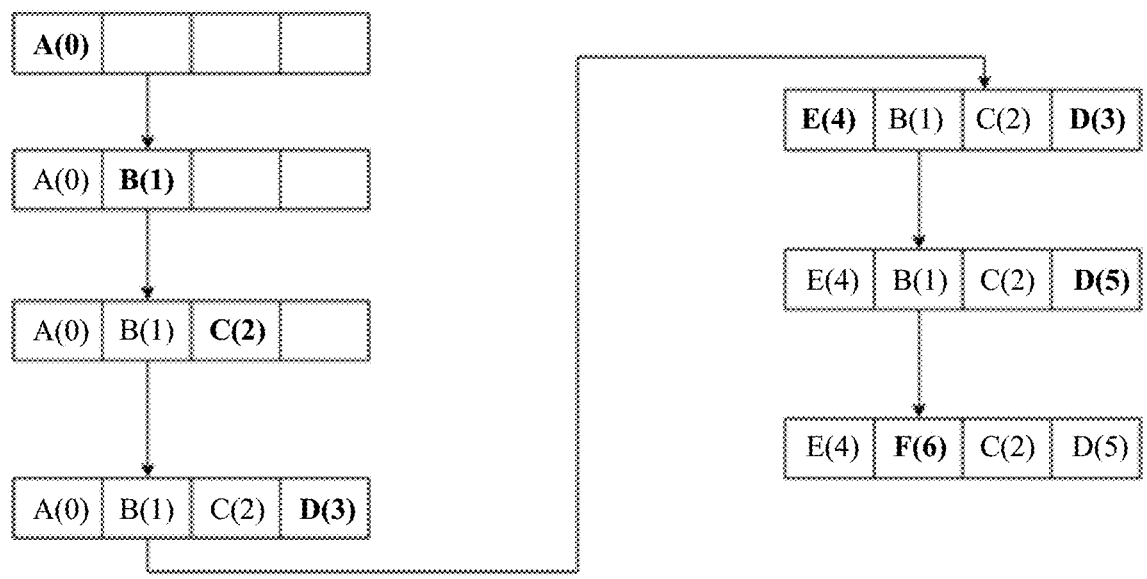
FIG. 4 is a schematic diagram of an application of an LRU algorithm according to an embodiment of this application.

Generally, a controller is responsible for managing the log buffer. The controller manages the memory page in the log buffer according to the LRU algorithm. In an embodiment, the controller records a life cycle of data in each memory page. As shown in FIG. 4, it is assumed that there are four memory pages in the log buffer, and elements A, B, C, and D are sequentially written into the four memory pages. Because the element D is recently stored, and the element A is first written, life cycles of the elements A, B, C, and D are 0, 1, 2, and 3 respectively. In FIG. 4, the element B is used as an example. B(1) indicates that a life cycle of the element B is 1. Other elements are similar, and details are not described herein again. If an element E needs to be written into the log buffer in this case, because a life cycle of the element A is the shortest, the element E is written into a memory page in which the element A is located, that is, the element A is replaced with the element E. Similarly, if an element F needs to continue to be written, the element B is replaced with the element F.

Figure 5:
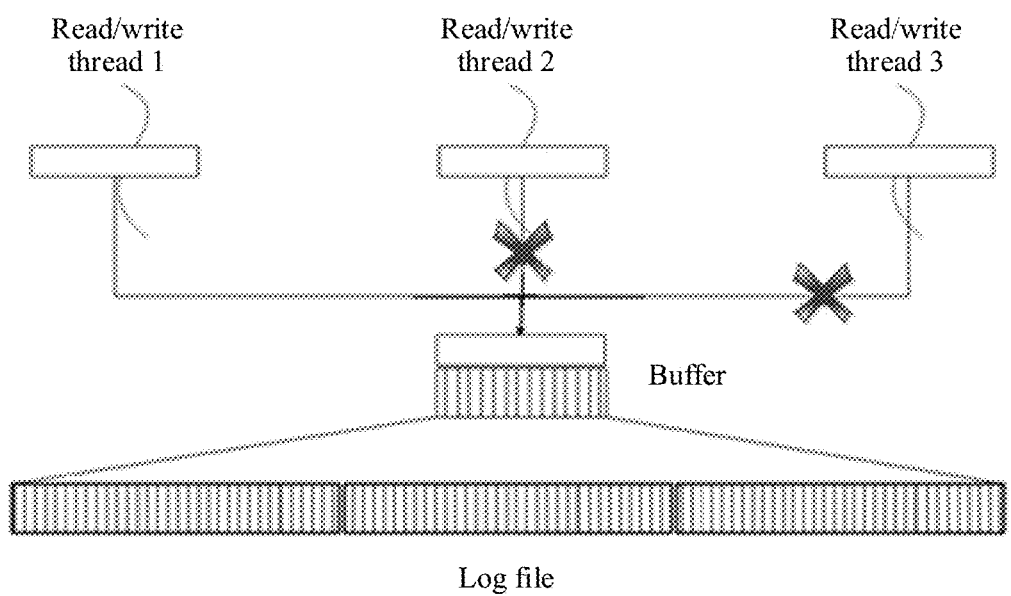
FIG. 5 is a schematic working diagram of a buffer in a conventional technology.

In addition to controlling reading and writing of the log in the log buffer, the controller is also used to manage a status of the log buffer. The status of the log buffer may include a size of the log buffer, a quantity of memory pages in the log buffer, a status of the memory page in the log buffer, a largest write page, a pointer of the log buffer, and a lock of the log buffer. It may be understood that data may be written into the disk page in the disk by using the buffer, and the largest write page refers to a largest number value of the disk page into which the data has been written by using the log buffer. The lock of the log buffer is globally unique and is used to lock the log buffer. For example, as shown in FIG. 5, when a read/write thread 1 needs to write a log into a memory page of the log buffer, a buffer controller locks the log buffer. The locked log buffer can be operated only by the current read/write thread, and a read/write thread 2 and a read/write thread 3 cannot perform a read or write operation on the log buffer.

It can be learned that different threads need to contend for a lock resource of the log buffer, and the contention limits improvement of database system performance. Therefore, in an embodiment of the application, the log buffer is partitioned, and then a partitioned buffer is separately allocated to each node in the NUMA system. In this way, if a log buffer on one node is locked, reading/writing of a log buffer on another node is not affected. Therefore, the embodiments of this application can reduce contention of different threads for a lock resource of the log buffer, thereby improving database performance.

Because nodes in the NUMA system are usually the same, the log buffer may be evenly allocated to the nodes in the NUMA system. For example, if a size, of the log buffer, expected by a user is 4 MB, and the NUMA system includes four nodes, a log buffer of 1 MB may be allocated to each node. Accordingly, a buffer controller that controls the log buffer is also configured on each node. For any node, a CPU of the node may access a log buffer in a near memory, and may also access a log buffer in a remote memory.

It should be noted that the foregoing describes the data read/write method provided in an embodiment of the application by using the log buffer. In addition, the data read/write method provided in an embodiment of the application may also be applied to another similar buffer. For example, a memory block may be allocated as a buffer to read/write data such as a delivery tracking number and a commodity number. The following separately describes a data write method and a data read method.

Figure 6:
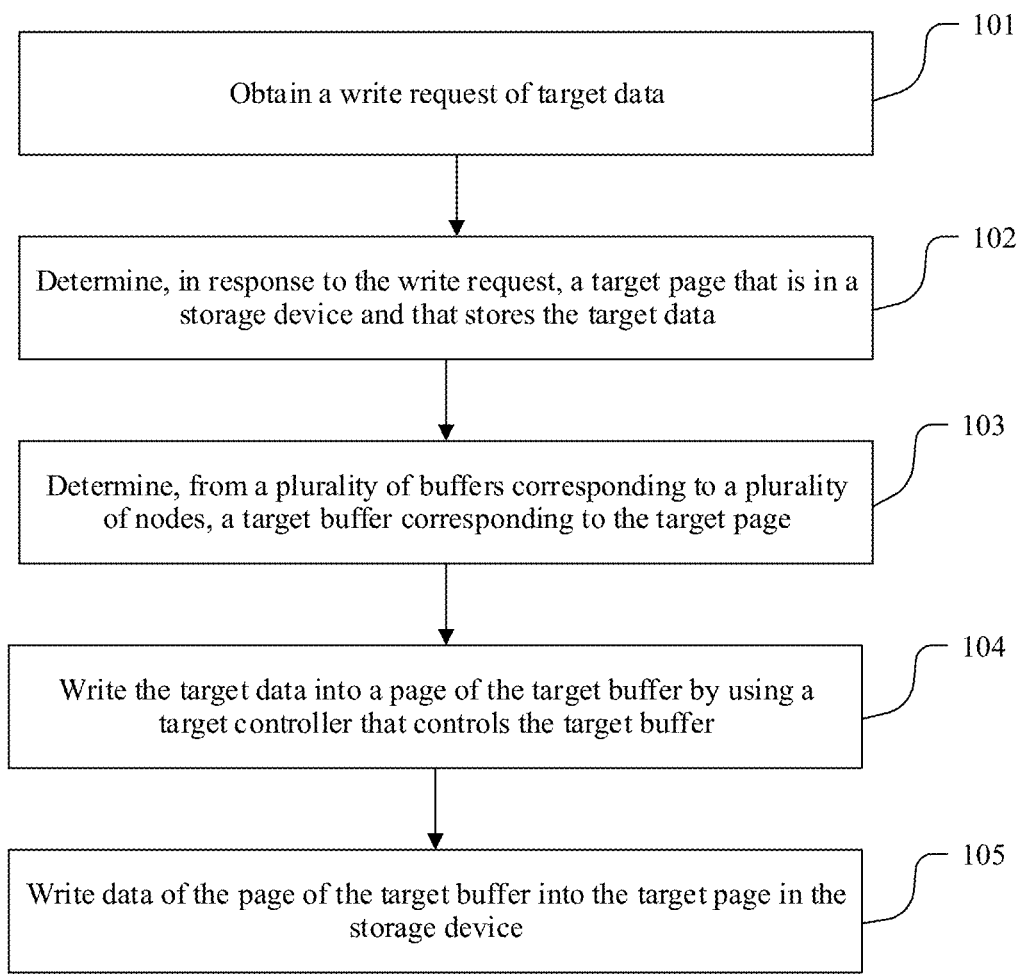
FIG. 6 is a schematic diagram of an embodiment of a data write method according to an embodiment of this application.

First, a data write method provided in an embodiment of this application is described. In an embodiment, FIG. 6 is a schematic diagram of an embodiment of a data write method according to an embodiment of this application. As shown in FIG. 6, an embodiment of this application provides a data write method, applied to a computer device, where the computer device includes a plurality of nodes in a non-uniform memory access architecture NUMA system, and each node has a buffer and a controller that controls the buffer.

The computer device may be a terminal device, or may be a server. The data write method provided in an embodiment of the application is usually applied to the server.

Based on the foregoing description of the buffer and the controller that controls the buffer, refer to the foregoing related description for understanding.

The data write method provided in an embodiment of the application includes the following operations.

Operation 101: Obtain a write request of target data.

It should be noted that the write request may not include the target data, but includes only information related to the target data. For example, the write request may include an identifier of the target data, and may include storage space required by the target data.

There may be a plurality of types of the target data. This is not limited in an embodiment of the application. For example, in an embodiment of the application, the target data may indicate a status of a database transaction, or may indicate a delivery tracking number or a commodity number.

Operation 102: Determine, in response to the write request, a target page that is in a storage device and that stores the target data.

The storage device may be various types of non-transitory storage media such as a magnetic disk, a hard disk, and a storage array.

When the storage device is the disk, data in the disk is formed by a plurality of disk files, and each disk file is formed by 8 KB disk pages.

After the write request is obtained, the target page needs to be first determined, and the target page stores the target data.

There are a plurality of cases of the target page. The following uses the disk as an example for description, and a target disk page is used to identify the target page. In a first case, if the write request indicates that the target data needs to be written, there is a disk page in the disk, and the disk page stores historical data corresponding to the target data. In a process of writing the target data, the historical data in the disk page is replaced with the target data. In this scenario, the target page is a disk page that is in the disk and that stores the historical data corresponding to the target data. If the read/write request indicates that the target data needs to be read, it means that the target disk page is also a disk page that is in the disk and that stores the historical data corresponding to the target data. In a second case, if the read/write request indicates that the target data needs to be written, but a disk page that stores historical data corresponding to the target data does not exist in the disk, a blank disk page needs to be used as the target disk page.

It should be noted that there are a plurality of methods for determining the target page. This is not limited in an embodiment of the application.

For example, the storage device is configured to store preset-type data, and storage space required by each piece of the preset-type data is fixed.

The preset-type data may indicate a status of a database transaction. The status of the database transaction can be processing, committed, aborted, or subtransaction committed. Data that indicates the status of the database transaction is also referred to as a transaction commit log, and storage space required by each transaction commit log is 2 bits.

It should be understood that the data is usually continuously stored in the storage device. The disk is used as an example. In an embodiment, in a process of writing the transaction submission log, the transaction submission log is sequentially written into a current disk page. If the current disk page is full, the transaction submission log continues to be written into a next disk page. Therefore, if the disk page stores only the preset-type data, and the storage space required by each piece of preset-type data is fixed, a disk page to which each piece of preset-type data belongs is determined. It can be learned that a page, in the storage device, to which each piece of preset-type data belongs is also determined.

Based on this, if the target data belongs to the preset-type data and the write request includes the identifier of the target data, the determining, in response to the write request, the target page that is in the storage device and that stores the target data includes:

determining, based on at least the identifier of the target data and the storage space required by each piece of the preset-type data, the target page that is in the storage device and that stores the target data.

The identifier of the target data may be a number of the target data. When the target data indicates the status of the database transaction, the number of the target data may be a number of the database transaction.

For example, if the storage device is the disk, the preset-type data indicates the status of the database transaction, and the number of the target data is the number of the database transaction, a product of the number of the data transaction and the storage space (2 bits herein) required by each piece of preset-type data may be first obtained, and then the product is divided by the size (that is, 8k) of the disk page, a number of the target disk page may be obtained, so that the target disk page is determined.

Operation 103: Determine, from a plurality of buffers corresponding to the plurality of nodes, a target buffer corresponding to the target page.

After the target page is determined, a page allocator allocates the target page to a buffer on one node in the buffers of the plurality of nodes. In an embodiment, the page allocator needs to select a buffer on one node from the buffers of the plurality of nodes as the target buffer, and a target controller controls the target buffer to interact with the storage device, to read or write the target data in the target page.

It should be noted that there are a plurality of methods for determining the target buffer. For example, a buffer on one node may be randomly selected as the target buffer.

In addition, a corresponding rule may also be preset, so that the target buffer is selected according to the rule.

For example, the method for determining the target buffer includes: determining, based on a page number of the target page, the target buffer corresponding to the target page from the plurality of buffers corresponding to the plurality of nodes.

In an embodiment, the determining, based on the page number of the target page, the target buffer corresponding to the target page from the plurality of buffers corresponding to the plurality of nodes includes:

obtaining, according to a hash algorithm, a hash value corresponding to the page number of the target page, where the hash value may be set according to an actual requirement; and determining, based on the hash value, the target buffer corresponding to the target page, where a buffer, in the plurality of buffers corresponding to the plurality of nodes, whose number is corresponding to the hash value is the target buffer. In an implementable, a buffer whose number is the same as the hash value is the target buffer.

For example, a remainder of the page number of the target disk page divided by a quantity of buffers may be obtained according to the hash algorithm, and then the target buffer corresponding to the target page is determined, based on the remainder, from the plurality of buffers corresponding to the plurality of nodes.

For example, the NUMA system shown in FIG. 1 is used as an example. The NUMA system includes four nodes. The four nodes may be numbered 0, 1, 2, and 3 in advance. When the remainder is 0, a buffer on the node numbered 0 is used as the target buffer. When the remainder is 2, a buffer on the node numbered 2 is used as the target buffer.

In this method, the disk page may be evenly allocated to a buffer on each node as the page number increases.

For example, the determining the target buffer based on the page number of the target disk page may also include: distributing disk pages in the disk into a plurality of groups based on the page number, where each group of disk pages belongs to a buffer on one node; and after obtaining the target disk page, first determining a group to which the target disk page belongs, and then determining the target buffer based on the group to which the target disk page belongs.

For example, it is assumed that numbers of all disk pages in the disk are 1 to 400, and the NUMA system shown in FIG. 1 is still used as an example. In FIG. 1, page numbers of a group of disk pages respectively corresponding to four nodes 102a, 102b, 103a, and 103b are 1 to 100, 101 to 200, 201 to 300, and 301 to 400. If the page number of the target disk page is 150, it may be determined that a buffer on the node 102b is the target buffer. If the page number of the target disk page is 301, it is determined that a buffer on the node 103b is the target buffer.

Operation 104: Write the target data into a page of the target buffer by using the target controller that controls the target buffer.

It should be noted that the writing the target data into the page of the target buffer is a mature technology, and therefore details are not described herein.

Operation 105: Write data of the page of the target buffer into the target page in the storage device.

Similarly, the writing the data of the page of the target buffer into the target page in the storage device is also a mature technology, and therefore details are not described herein.

In an embodiment of the application, the plurality of nodes each have a buffer and a controller that controls the buffer, and therefore even if a buffer on one node is locked, reading/writing of a buffer on another node are not affected. Therefore, the embodiments of this application can reduce contention of different threads for a lock resource of the buffer, thereby improving database performance.

Figure 7:
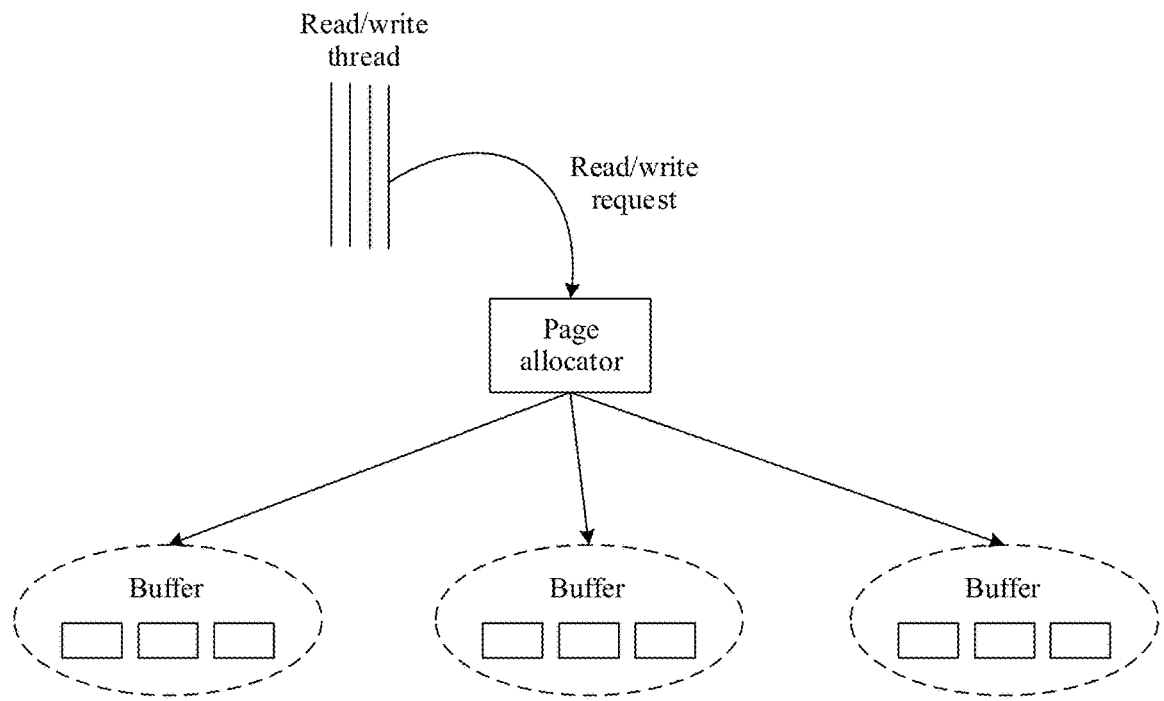
FIG. 7 is a schematic diagram of an application example of a data write method according to an embodiment of this application.
Figure 8:
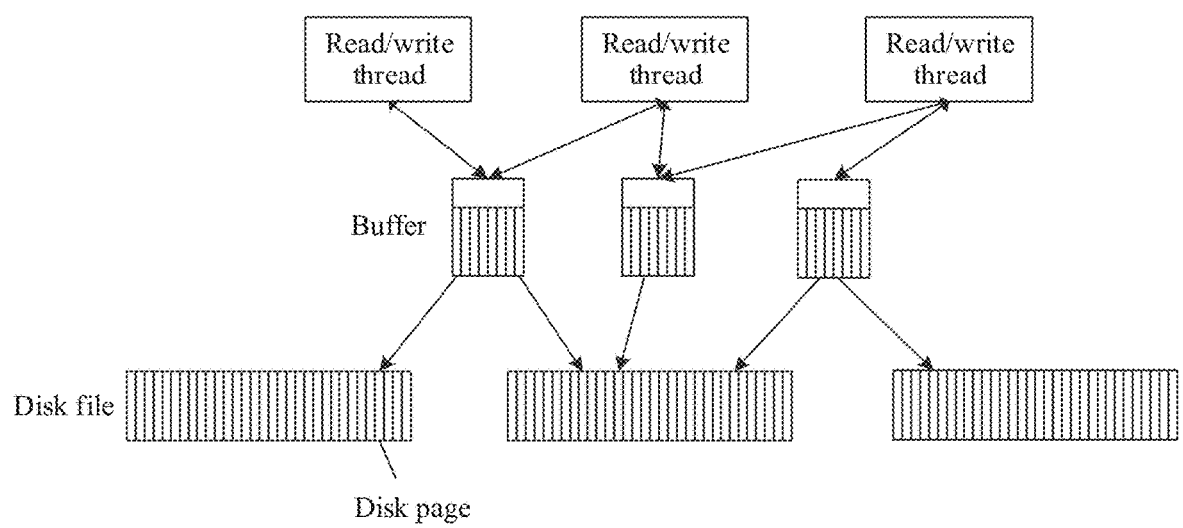
FIG. 8 is a schematic diagram of another application example of a data write method according to an embodiment of this application.

For ease of understanding, the following further describes the method in the embodiments of this application with reference to FIG. 7 and FIG. 8.

As shown in FIG. 7, there are three buffers. A read/write thread sends a write request of target data to a page allocator, and the page allocator determines, based on the write request, a target page that stores the target data. Then, one of the three buffers is selected as the target buffer, and then the target data is written into the target buffer by using a controller for the target buffer.

As shown in FIG. 8, the storage device is a disk, and there are three read/write threads, three buffers, and three disk files in the disk. According to the method provided in an embodiment of the application, a same read/write thread may write the target data by using different buffers. Compared with FIG. 5, the three read/write threads can write the target data by using only one buffer. In an embodiment of the application, contention of different threads for a lock resource of the buffer can be reduced, thereby improving database performance.

Figure 9:
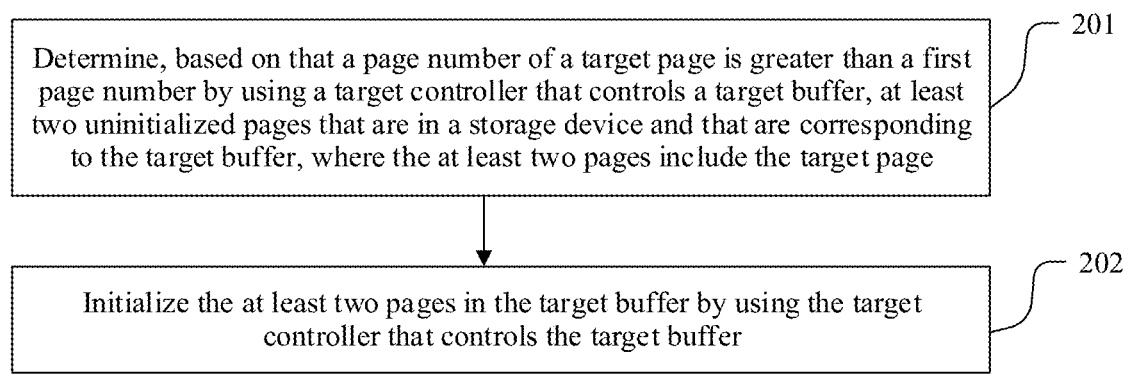
FIG. 9 is a schematic diagram of another embodiment of a data write method according to an embodiment of this application.

Based on the foregoing embodiments, as shown in FIG. 9, in another embodiment of the data write method provided in the embodiments of this application, the writing the target data into the page of the target buffer by using the target controller that controls the target buffer includes:

Operation 201: Determine, based on that the page number of the target page is greater than a first page number by using the target controller that controls the target buffer, at least two uninitialized pages that are in the storage device and that are corresponding to the target buffer, where the at least two pages include the target page.

The first page number is a largest page number in initialized pages in the storage device. If the page number of the target page is greater than the first page number, it indicates that the target page is not initialized.

The initializing the target page refers to associating a blank memory page in the target buffer with the target page, so that the target data can be written into the target page by using the blank memory page.

It should be noted that, in some scenarios, the target buffer may further correspond to another uninitialized page. Therefore, the at least two uninitialized pages corresponding to the target buffer may be determined, and then the at least two uninitialized pages corresponding to the target buffer are initialized.

Figure 10:
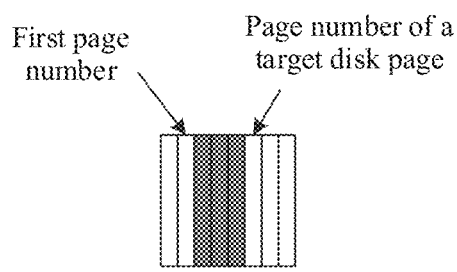
FIG. 10 is a schematic diagram of a relationship between a first page number and a page number of a target disk page.

For example, as shown in FIG. 10, a disk page is used as an example, that is, the target page is the target disk page. All disk pages in FIG. 10 are disk pages corresponding to the target buffer. It can be learned from FIG. 10 that three uninitialized disk pages are included between the first page number and the page number of the target disk page.

Operation 202: Initialize the at least two pages in the target buffer by using the target controller that controls the target buffer.

It should be noted that, in a process of initializing the at least two pages, it first needs to be ensured that the target buffer includes at least two blank memory pages. It should be noted that, in a scenario, there are the at least two blank memory pages in the target buffer; and in another scenario, there is no blank memory page in the target buffer. In this case, data in some memory pages may be cleared according to the foregoing mentioned LRU algorithm, to obtain the at least two blank memory pages.

In an embodiment of the application, when the at least two uninitialized pages are initialized, initialization actions can be combined, and a quantity of initialization operations is reduced, thereby reducing lock contention and frequent memory operations.

The foregoing describes the data write method, and the following describes a data read method provided in an embodiment of this application.

Figure 11:
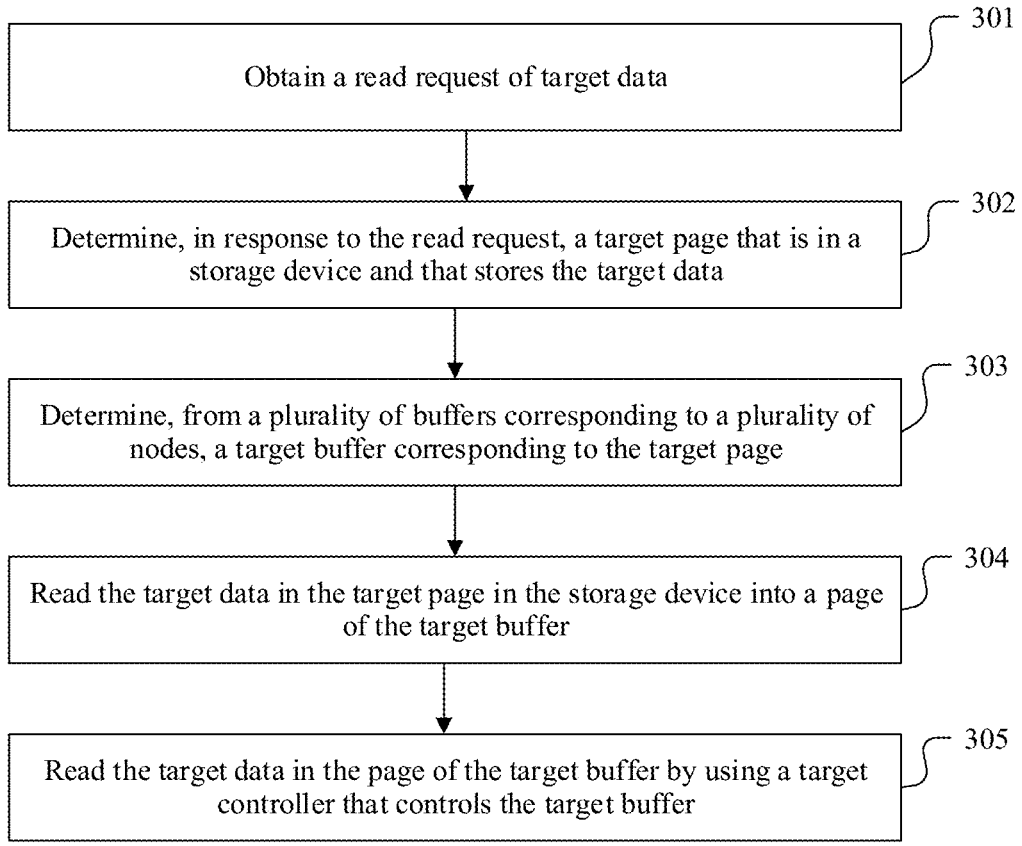
FIG. 11 is a schematic diagram of an embodiment of a data read method according to an embodiment of this application.

As shown in FIG. 11, an embodiment of this application provides a data read method, applied to a computer device, where the computer device includes a storage device and a plurality of nodes in a non-uniform memory access architecture NUMA system, and each node has a buffer and a controller that controls the buffer. The method includes the following operations.

Operation 301: Obtain a read request of target data.

Operation 302: Determine, in response to the read request, a target page that is in a storage device and that stores the target data.

Operation 303: Determine, from a plurality of buffers corresponding to the plurality of nodes, a target buffer corresponding to the target page.

Operation 304: Read the target data in the target page in the storage device to a page of the target buffer.

Operation 305: Read the target data in the page of the target buffer by using a target controller that controls the target buffer.

It should be noted that the data read method is similar to the data write method, and an only difference lies is that in a data reading process, the target data in the target page in the storage device needs to be first read to the page of the target buffer, and then the target data in the page of the target buffer is read by using the target controller that controls the target buffer. For other descriptions, refer to related descriptions of the data write method in the foregoing embodiments for understanding.

In another embodiment of the data read method provided in an embodiment of the application, the storage device is configured to store preset-type data, and storage space required by each piece of the preset-type data is fixed. The target data belongs to the preset-type data, and the write request includes an identifier of the target data.

The determining, in response to the read request, the target page that is in the storage device and that stores the target data includes:

determining, based on at least the identifier of the target data and the storage space required by each piece of the preset-type data, the target page that is in the storage device and that stores the target data.

It should be noted that, for a process of determining the target page, refer to related descriptions of the data write method in the foregoing embodiments for understanding.

In another embodiment of the data read method provided in the embodiments of this application, the preset-type data indicates a status of a database transaction.

In another embodiment of the data read method provided in the embodiments of this application, the identifier of the target data is a number of the target data.

In another embodiment of the data read method provided in an embodiment of the application, the determining, from the plurality of buffers corresponding to the plurality of nodes, the target buffer corresponding to the target page includes:

determining, based on a page number of the target page, the target buffer corresponding to the target page from the plurality of buffers corresponding to the plurality of nodes.

It should be noted that, for a process of determining the target buffer, refer to related descriptions of the data write method in the foregoing embodiments for understanding.

In another embodiment of the data read method provided in an embodiment of the application, the determining, based on the page number of the target page from the plurality of buffers corresponding to the plurality of nodes, the target buffer corresponding to the target page includes:

obtaining, according to a hash algorithm, a hash value corresponding to the page number of the target page; and determining, based on the hash value, the target buffer corresponding to the target page, where a buffer, in the plurality of buffers corresponding to the plurality of nodes, whose number is corresponding to the hash value is the target buffer.

It should be noted that, for a process of determining the target buffer, refer to related descriptions of the data write method in the foregoing embodiments for understanding.

Figure 12:
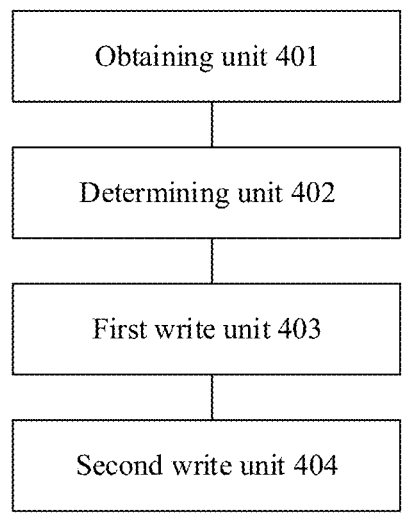
FIG. 12 is a schematic diagram of an embodiment of a data write apparatus according to an embodiment of this application.

Refer to FIG. 12. An embodiment of this application provides a data write apparatus, applied to a computer device, where the computer device includes a plurality of nodes in a non-uniform memory access architecture NUMA system, each node has a buffer and a controller that controls the buffer, the buffer in each node is configured to perform data read or write on a plurality of disk pages in a disk, and the apparatus includes:

an obtaining unit 401, configured to obtain a write request of target data;

a determining unit 402, configured to determine, in response to the write request, a target page that is in the storage device and that stores the target data, where the determining unit 402 is further configured to determine, from a plurality of buffers corresponding to the plurality of nodes, a target buffer corresponding to the target page;

a first write unit 403, configured to write the target data into a page of the target buffer by using a target controller that controls the target buffer; and a second write unit 404, further configured to write data of the page of the target buffer into the target page in the storage device.

In an embodiment, the storage device is configured to store preset-type data, and storage space required by each piece of the preset-type data is fixed. The target data belongs to the preset-type data, and the write request includes an identifier of the target data.

The determining unit 402 is configured to determine, based on at least the identifier of the target data and the storage space required by each piece of the preset-type data, the target page that is in the storage device and that stores the target data.

This embodiment provides a feasible solution for determining the target page in a scenario in which the storage device is configured to the store preset-type data, and the storage space required by each piece of the preset-type data is fixed.

In an embodiment, the preset-type data indicates a status of a database transaction.

In an embodiment, the identifier of the target data is a number of the target data.

In an embodiment, the determining unit 402 is further configured to determine, based on a page number of the target page, the target buffer corresponding to the target page from the plurality of buffers corresponding to the plurality of nodes.

In an embodiment, the target buffer is determined by using the page number of the target page, thereby providing a feasible solution for determining the target buffer.

In an embodiment, the determining unit 402 is configured to obtain, according to a hash algorithm, a hash value corresponding to the page number of the target page; and determine, based on the hash value, the target buffer corresponding to the target page, where a buffer, in the plurality of buffers corresponding to the plurality of nodes, whose number is corresponding to the hash value is the target buffer.

A process of determining the target buffer may be more accurate and efficient according to the hash algorithm.

In an embodiment, the first write unit 403 is configured to determine, based on that the page number of the target page is greater than a first page number by using the target controller that controls the target buffer, at least two uninitialized disk pages that are in the storage device and that are corresponding to the target buffer, where the at least two disk pages include the target disk page; and initialize the at least two disk pages in the target buffer by using the target controller that controls the target buffer, where the first page number is a largest page number in initialized pages in the storage device.

When the at least two uninitialized disk pages are initialized, initialization actions can be combined, and a quantity of initialization operations is reduced, thereby reducing lock contention and frequent memory operations.

Figure 13:
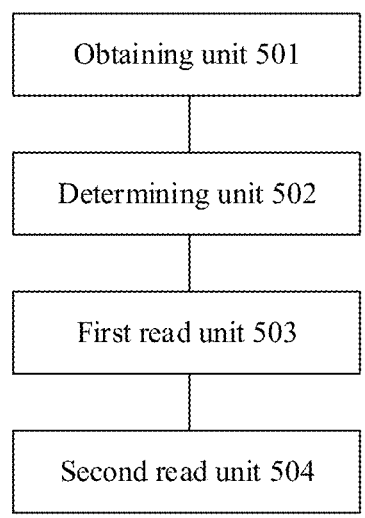
FIG. 13 is a schematic diagram of an embodiment of a data read apparatus according to an embodiment of this application.

Refer to FIG. 13. An embodiment of this application provides a data read apparatus, applied to a computer device, where the computer device includes a storage device and a plurality of nodes in a non-uniform memory access architecture NUMA system, each node has a buffer and a controller that controls the buffer, and the apparatus includes:

an obtaining unit 501, configured to obtain a read request of target data;

a determining unit 502, configured to determine, in response to the read request, a target page that is in the storage device and that stores the target data, where the determining unit 502 is further configured to determine, from a plurality of buffers corresponding to the plurality of nodes, a target buffer corresponding to the target page;

a first read unit 503, configured to read the target data in the target page in the storage device to a page of the target buffer; and a second read unit 504, configured to read the target data in the page of the target buffer by using a target controller that controls the target buffer.

In an embodiment, the storage device is configured to store preset-type data, and storage space required by each piece of the preset-type data is fixed; the target data belongs to the preset-type data, and the write request includes an identifier of the target data; and the determining unit 502 is configured to determine, based on at least the identifier of the target data and the storage space required by each piece of the preset-type data, the target page that is in the storage device and that stores the target data.

This embodiment provides a feasible solution for determining the target page in a scenario in which the storage device is configured to the store preset-type data, and the storage space required by each piece of the preset-type data is fixed.

In an embodiment, the preset-type data indicates a status of a database transaction.

In an embodiment, the identifier of the target data is a number of the target data.

In an embodiment, the determining unit 502 is further configured to determine, based on a page number of the target page, the target buffer corresponding to the target page from the plurality of buffers corresponding to the plurality of nodes.

In an embodiment, the target buffer is determined by using the page number of the target page, thereby providing a feasible solution for determining the target buffer.

In an embodiment, the determining unit 502 is configured to obtain, according to a hash algorithm, a hash value corresponding to the page number of the target page; and determine, based on the hash value, the target buffer corresponding to the target page, where a buffer, in the plurality of buffers corresponding to the plurality of nodes, whose number is corresponding to the hash value is the target buffer.

A process of determining the target buffer may be more accurate and efficient according to the hash algorithm.

It should be noted that, in an embodiment, the data read/write apparatus and the data write apparatus are computer programs running on a computer device, and the computer programs may be executed by a processor of the computer device to implement functions thereof.

An embodiment of this application further provides an NUMA system, including a plurality of nodes, where each node has a buffer and a controller that controls the buffer, and at least one of the plurality of nodes is configured to perform the data read method or the data write method in any one of the foregoing embodiments.

An embodiment of this application further provides a computer device. The computer device includes a plurality of nodes in a non-uniform memory access architecture NUMA system, and each node has a buffer and a controller that controls the buffer, and at least one of the plurality of nodes is configured to perform the data read method or the data write method in any one of the foregoing embodiments.

An embodiment of this application further provides a chip or a chip system. The chip or the chip system includes at least one processor and a communications interface. The communications interface is connected to the at least one processor through a line. The at least one processor is configured to run a computer program or instructions, to perform an operation performed by the data write apparatus in the embodiment shown in FIG. 12, or perform an operation performed by the data read apparatus in the embodiment shown in FIG. 13. Details are not described herein again.

The communication interface in the chip may be an input/output interface, a pin, a circuit, or the like.

In an embodiment, the at least one processor is a non-uniform memory access architecture NUMA system including a plurality of nodes, and one or more of the plurality of nodes jointly perform the data read method or the data write method in any one of the foregoing embodiments.

An embodiment of this application further provides a computer storage medium. The computer storage medium is configured to store computer software instructions used by the foregoing control device, and the computer software instructions include a program designed for execution by the computer device.

The computer device may be the data write apparatus described in FIG. 12 or the data read apparatus described in FIG. 13.

An embodiment of this application further provides a computer program product. The computer program product includes computer software instructions, and the computer software instructions may be loaded by a processor to implement a procedure of the data read method or the data write method in any one of the foregoing embodiments.

It may be clearly understood by one of ordinary skilled in the art that, for the purpose of convenient and brief description, for a detailed working process of the foregoing system, apparatus, and unit, refer to a corresponding process in the foregoing method embodiments, and details are not described herein again.

In the several embodiments provided in this application, it should be understood that the disclosed systems, apparatuses, and methods may be implemented in another manner. For example, the described apparatus embodiment is merely an example. For example, division into the units is merely logical function division and may be other division in actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected based on actual requirements to achieve the objectives of the solutions of embodiments.

In addition, functional units in embodiments of this application may be integrated into one processing unit, each of the units may exist alone physically, or two or more units may be integrated into one unit. The integrated unit may be implemented in a form of hardware, or may be implemented in a form of a software functional unit.

When the integrated unit is implemented in the form of the software functional unit and sold or used as an independent product, the integrated unit may be stored in a computer-readable storage medium. Based on such an understanding, the technical solutions of this application essentially, or the part contributing to the prior art, or all or some of the technical solutions may be implemented in the form of a software product. The computer software product is stored in a storage medium and includes several instructions for instructing a computer device (which may be a personal computer, a server, or a network device) to perform all or some of the operations of the methods described in embodiments of this application. The storage medium includes any medium that can store program code, such as a USB flash drive, a removable hard disk, a read-only memory (ROM), a random access memory (RAM), a magnetic disk, or an optical disc.

What is claimed is:

1. A data write method applied to a computer device comprising:
   obtaining a write request of target data;
   determining, in response to the write request, a target page in a storage device that stores the target data, wherein the computer device comprises the storage device and a plurality of nodes in a non-uniform memory access architecture (NUMA) system, each node has a buffer and a controller that controls the buffer;
   determining, from a plurality of buffers corresponding to the plurality of nodes, a target buffer corresponding to the target page;
   writing the target data into a page of the target buffer by using a target controller that controls the target buffer; and
   writing data of the page of the target buffer into the target page in the storage device.

2. The method according to claim 1, wherein the storage device is configured to store preset-type data, and storage space required by each piece of the preset-type data is fixed;
   the target data belongs to the preset-type data, and the write request comprises an identifier of the target data; and
   the determining the target page in the storage device that stores the target data comprises:
   determining, based on at least the identifier of the target data and the storage space required by each piece of the preset-type data, the target page in the storage device that stores the target data.

3. The method according to claim 2, wherein the preset-type data indicates a status of a database transaction.

4. The method according to claim 2, wherein the identifier of the target data is a number of the target data.

5. The method according to claim 1, wherein the determining the target buffer corresponding to the target page comprises:
   determining, based on a page number of the target page, the target buffer corresponding to the target page from the plurality of buffers corresponding to the plurality of nodes.

6. The method according to claim 5, wherein the determining the target buffer corresponding to the target page from the plurality of buffers corresponding to the plurality of nodes comprises:
   obtaining, according to a hash algorithm, a hash value corresponding to the page number of the target page; and
   determining, based on the hash value, the target buffer corresponding to the target page, wherein a buffer, in the plurality of buffers corresponding to the plurality of nodes, whose number is corresponding to the hash value is the target buffer.

7. The method according to claim 1, wherein the writing the target data into the page of the target buffer by using the target controller that controls the target buffer comprises:
   determining, based on that the page number of the target page is greater than a first page number by using the target controller that controls the target buffer, at least two uninitialized pages in the storage device corresponding to the target buffer, wherein the at least two pages comprise the target page; and
   initializing the at least two pages in the target buffer by using the target controller that controls the target buffer, wherein
   the first page number is a largest page number in initialized pages in the storage device.

8. A data read method applied to a computer device comprising:
   obtaining a read request of target data;
   determining, in response to the read request, a target page in a storage device that stores the target data, wherein the computer device comprises the storage device and a plurality of nodes in a non-uniform memory access architecture (NUMA) system, each node has a buffer and a controller that controls the buffer;

determining, from a plurality of buffers corresponding to the plurality of nodes, a target buffer corresponding to the target page;

reading the target data in the target page in the storage device to a page of the target buffer; and reading the target data in the page of the target buffer by using a target controller that controls the target buffer.

9. The method according to claim 8, wherein the storage device is configured to store preset-type data, and storage space required by each piece of the preset-type data is fixed;

the target data belongs to the preset-type data, and the write request comprises an identifier of the target data; and the determining the target page in the storage device and that stores the target data comprises:

determining, based on at least the identifier of the target data and the storage space required by each piece of the preset-type data, the target page in the storage device that stores the target data.

10. The method according to claim 9, wherein the preset-type data indicates a status of a database transaction.

11. The method according to claim 9, wherein the identifier of the target data is a number of the target data.

12. The method according to claim 8, wherein the determining the target buffer corresponding to the target page comprises:

determining, based on a page number of the target page, the target buffer corresponding to the target page from the plurality of buffers corresponding to the plurality of nodes.

13. The method according to claim 12, wherein the determining the target buffer corresponding to the target page from the plurality of buffers corresponding to the plurality of nodes comprises:

obtaining, according to a hash algorithm, a hash value corresponding to the page number of the target page; and determining, based on the hash value, the target buffer corresponding to the target page, wherein a buffer, in the plurality of buffers corresponding to the plurality of nodes, whose number is corresponding to the hash value is the target buffer.

14. A data write apparatus, applied to a computer device, wherein the computer device comprises a plurality of nodes in a non-uniform memory access architecture (NUMA) system, each node has a buffer and a controller that controls the buffer, the buffer in each node is configured to perform operations including data read or write on a plurality of disk pages in a disk, and the operations comprising:

obtaining a write request of target data;

determining, in response to the write request, a target page in a storage device and that stores the target data, wherein determining, from a plurality of buffers corresponding to the plurality of nodes, a target buffer corresponding to the target page;

writing the target data into a page of the target buffer by using a target controller that controls the target buffer; and writing data of the page of the target buffer into the target page in the storage device.

15. A data read apparatus applied to a computer device, comprising:

a processor, and a memory coupled to the processor to store instructions, which when executed by the processor, cause the apparatus to perform operations, the operations comprising:

obtaining a read request of target data;

determining, in response to the read request, a target page in a storage device that stores the target data, wherein the computer device comprises the storage device and a plurality of nodes in a non-uniform memory access architecture (NUMA) system, each node has a buffer and a controller that controls the buffer, wherein determining, from a plurality of buffers corresponding to the plurality of nodes, a target buffer corresponding to the target page;

reading the target data in the target page in the storage device to a page of the target buffer; and reading the target data in the page of the target buffer by using a target controller that controls the target buffer.

16. The apparatus according to claim 15, wherein the storage device is configured to store preset-type data, and storage space required by each piece of the preset-type data is fixed;

the target data belongs to the preset-type data, and the write request comprises an identifier of the target data; and the determining the target page in the storage device that stores the target data comprises:

determining, based on at least the identifier of the target data and the storage space required by each piece of the preset-type data, the target page in the storage device that stores the target data.

17. The apparatus according to claim 16, wherein the preset-type data indicates a status of a database transaction.

18. The apparatus according to claim 16, wherein the identifier of the target data is a number of the target data.

19. The apparatus according to claim 15, wherein the determining the target buffer corresponding to the target page comprises:

determining, based on a page number of the target page, the target buffer corresponding to the target page from the plurality of buffers corresponding to the plurality of nodes.

20. The apparatus according to claim 19, wherein the determining the target buffer corresponding to the target page from the plurality of buffers corresponding to the plurality of nodes comprises:

obtaining, according to a hash algorithm, a hash value corresponding to the page number of the target page; and determining, based on the hash value, the target buffer corresponding to the target page, wherein a buffer, in the plurality of buffers corresponding to the plurality of nodes, whose number is corresponding to the hash value is the target buffer.

* * * * *